United States Patent
Dickerman

(10) Patent No.: US 11,181,503 B1
(45) Date of Patent: Nov. 23, 2021

(54) STATIONARY DEVICES FOR DETERMINATION OF MAGNITUDE AND POLARITY OF ELECTROPHORETIC MOBILITY AND ZETA POTENTIAL

(71) Applicant: Robert Dickerman, Northfield, MA (US)

(72) Inventor: Robert Dickerman, Northfield, MA (US)

( * ) Notice: Subject to any disclaimer, the term of this patent is extended or adjusted under 35 U.S.C. 154(b) by 362 days.

(21) Appl. No.: 16/435,501

(22) Filed: Jun. 9, 2019

(51) Int. Cl.
| | |
|---|---|
| *G01N 27/447* | (2006.01) |
| *G01N 27/453* | (2006.01) |
| *H04B 10/63* | (2013.01) |
| *G01B 9/02* | (2006.01) |

(52) U.S. Cl.
CPC ... *G01N 27/44752* (2013.01); *G01B 9/02002* (2013.01); *G01B 9/02079* (2013.01); *G01N 27/44721* (2013.01); *G01N 27/453* (2013.01); *H04B 10/63* (2013.01); *G01B 2290/45* (2013.01); *G01B 2290/70* (2013.01)

(58) Field of Classification Search
CPC ..... G01N 27/44721; G01N 2015/0003; G01N 2015/1075; G01B 9/02079; G01B 2290/45; G01B 2290/70
See application file for complete search history.

(56) References Cited

U.S. PATENT DOCUMENTS

| | | | | |
|---|---|---|---|---|
| 4,360,271 A | * | 11/1982 | Downs | G01B 9/02079 356/493 |
| 5,995,223 A | * | 11/1999 | Power | G01J 9/02 356/495 |
| 6,020,963 A | | 2/2000 | DiMarzio | |
| 7,864,327 B1 | * | 1/2011 | Chen | G01B 9/0209 356/456 |
| 2006/0114467 A1 | * | 6/2006 | Nicoli | G01N 21/51 356/450 |
| 2014/0144780 A1 | * | 5/2014 | Noack | G01N 27/44721 204/549 |

OTHER PUBLICATIONS

Kuznetsov, A P. "Quadrature laser interferometry in the pulsed plasma diagnostic". Journal of Physics: Conference Series 666 (2016) Jan. 20, 2017. (Year: 2016).*

(Continued)

*Primary Examiner* — Michael A Lyons

(57) ABSTRACT

Devices and methods employing stationary homodyne interferometry to aid in the determination of the magnitude and polarity of electrophoretic mobility and zeta potential of particles are provided. The devices use an optical quadrature interferometer having a sample holder loadable with an electrophoresis sample chamber that may contain sample particles undergoing electrophoresis, the optical quadrature interferometer being configured to perform optical velocimetry on the particles and to generate a quadrature signal comprising characteristics related to the speeds and directions of the particles. The quadrature signal may be used to determine the speeds and directions of particles. The speeds and directions of particles may be used, together with other information, for the determination of the magnitudes and polarities of the electrophoretic mobility and zeta potential of the particles. Constraints on vibration, light source coherence length, and measurement resolution may be relaxed.

13 Claims, 6 Drawing Sheets

(56) References Cited

OTHER PUBLICATIONS

Hogenboom, et al., Quadrature detection of a Doppler signal, Applied Optics, May 1998, vol. 37, No. 13, OSA —The Optical Society, 2010 Massachusetts Ave., N.W., Washington, D C. 20036-1012.
Mir, et al., Quantitative Phase Imaging, 2012, Progress in Optics, vol. 57, p. 166, Elsevier, Radarweg 29, 1043 NX Amsterdam, The Netherlands.
Abramovitch, et al., A tutorial on laser interferometry for precision measurements, Conference Paper, 2013 American Control Conference (ACC), Washington, D.C., USA, Jun. 17-19, 2013, American Automatic Control Council, INC,8 The Green, Suite B, Dover, DE 19901-3618.
Wu, et al., Signal Processing Algorithms for Doppler Effect Based Nanometer Positioning Systems, Jpn. J. Appl. Phys., vol. 38 (1999), pp. 1725-1729, Part 1, No. 3B, Mar. 1999., Japanese Journal of Applied Physics, JSAP, Yushima Urban Building 7F, Feb. 31, 2022 Yushima, Bunkyo-ku, Tokyo 113-0034, Japan.

\* cited by examiner

US 11,181,503 B1

STATIONARY DEVICES FOR DETERMINATION OF MAGNITUDE AND POLARITY OF ELECTROPHORETIC MOBILITY AND ZETA POTENTIAL

TECHNICAL FIELD

The present disclosure relates to electrophoresis instruments that use optics and electronics to determine the speeds and directions of particles undergoing electrophoresis. Such speed and direction information may be used, together with other information, to determine the magnitudes and polarities of the electrophoretic mobility and zeta potential of particles.

BACKGROUND

Dispersions and suspensions of particles in fluids or gels are called colloids. A wide range of products constitute colloids, including many pharmaceuticals, food products, paints, and industrial materials, for example. A colloid's stability may be strongly dependent on the electrophoretic mobility and zeta potential of its particles, which, in turn, are related to the particles' electrostatic charges. This dependence may be used to advantage. For example, the propensity of particles to aggregate by coagulation, creaming, or sedimentation (perhaps thereby reducing shelf life), may be reduced if the magnitude of the electrophoretic mobility and zeta potential of the particles is increased. Conversely, in water treatment, for example, the dosage of flocculants (used to deliberately aggregate contaminant particles to ease filtering operations) may be optimized if the zeta potential of the particles is known. The electrophoretic mobility and zeta potential of particles may be manipulated by changing the pH, conductivity, or formulation concentration of a colloid. Electrophoresis may also be used to separate particles or macromolecules of different sizes or charges in a colloid or gel, as in DNA and RNA analysis; knowledge of the electrophoretic mobility and zeta potential of the particles may be useful for this process.

Electrophoresis is the movement of charged particles in a fluid or gel under the influence of an electric field. In a zeta potential or electrophoresis instrument an optical interferometer may be used to perform Doppler velocimetry by mixing a reference beam with light from a main beam that has been scattered by particles suspended in a electrophoresis sample chamber, whilst the particles are subjected to a known electric field. Populations of particles with similar zeta potential undergoing electrophoresis will be compelled by the field to drift generally in the same direction and with similar speed (except that speed profiles are affected by sample chamber electroosmosis and Brownian motion, as is well known). Field polarity may be cyclically reversed. The speed of the particles may be proportional to the strength of the applied field and the magnitude of the charge of the particles. The motion of the particles causes a Doppler shift in the frequency of the scattered light, with respect to the frequency of the reference beam light. When the light of the reference beam and the scattered light are recombined, the Doppler shift in the frequency of the scattered light may be manifested as a beat frequency in the envelope of the electric field of the combined light waves, i.e., a beat frequency in the recombined light intensity. This beat frequency is proportional to particle speed. In some applications, efficient interference between light in a reference beam and low-angle scattered light from a main beam is possible because the polarization of forward scattered main beam light is substantially unchanged from that of the main beam for angles less than approximately 30 degrees. A photodetector may be used to detect the envelope of light intensity and the beat frequency.

If a power spectral density function is computed for the photodetector signal, the Doppler shift or beat frequency will be manifested as a non-zero sample or peak in the power spectrum at the beat frequency, with the peak width depending, at least, on particle size and the spread of zeta potential. The beat frequency may be substantially proportional to the strength of the applied electric field, as well as to the magnitude of the zeta potential of the particles, and is also dependent on the specific optical geometry of any implementation. However, if the geometry of the optical system is known, and if parameters such as the frequency of the light source are known, the frequency of a spectral peak may be used to calculate a corresponding particle speed v, in a conventional manner. If the applied electric field strength E is also known, electrophoretic mobility $\mu_e$ may be calculated as $$\mu_e = \frac{v}{E}$$

If other information such as the viscosity and the dielectric constant of the fluid are also known, the electrophoretic mobility $\mu_e$ may be used to calculate the magnitude of zeta potential, for example, in a conventional manner.

The interferometer just described may be categorized as a homodyne interferometer, because, apart from Doppler shifts, only one light frequency is nominally used in the instrument.

Brownian motion of the particles broadens any observed beat frequency peaks. Smaller particles cause wider peaks, and, in addition to measuring electrophoretic mobility and zeta potential, many light scattering instruments analyze the broadened peaks to estimate size distributions for sample particles. Correlation functions, Fourier transforms, and power spectral density functions of the photodetector signal are commonly used for analysis.

The direction of motion of any given population of particles under study may be characterized as being either positive or negative, corresponding to particle motion in either the same or the opposite direction of the applied electric field; this direction will depend on the sign of the electrophoretic mobility of the particles. However, conventional electrophoresis or zeta potential instruments that employ homodyne interferometer velocimeters may be plagued by an inability to determine the directions of particles. This deficiency is similarly to that of homodyne devices used to measure monolithic target displacement in the field of precision metrology.

In conventional instruments, to cure this deficiency, a translating optical component, such as a mirror or corner reflector, may be included in one optical path of the interferometer, to continuously lengthen or shorten that optical path's length in a known manner. This changing optical path length will cause a known baseline frequency shift in the detector output signal that allows an unambiguous determination of the directions of the particles. This is because the Doppler shift caused by a particle's motion will add or subtract, respectively, from the baseline beat frequency between the unmodified light source frequency and the shifted frequency, depending on whether the sample particles drift in either the same or the opposite direction of the applied electric field, and have a velocity component directed towards, or away from, the optics that receive the scattered light. An oscillating mirror or Bragg cell may also be used to accomplish a similar known frequency shift. The apparatus used to cause a such a known frequency shift is called a phase modulator or frequency shifter. An interferometer that uses a phase modulator may be categorized as a heterodyne interferometer, because more than one source light frequency is nominally used in the instrument.

BRIEF DESCRIPTIONS OF THE DRAWINGS

Various apparatuses in accordance with the present disclosure will be described with reference to the drawings, in which.

Figure 1:
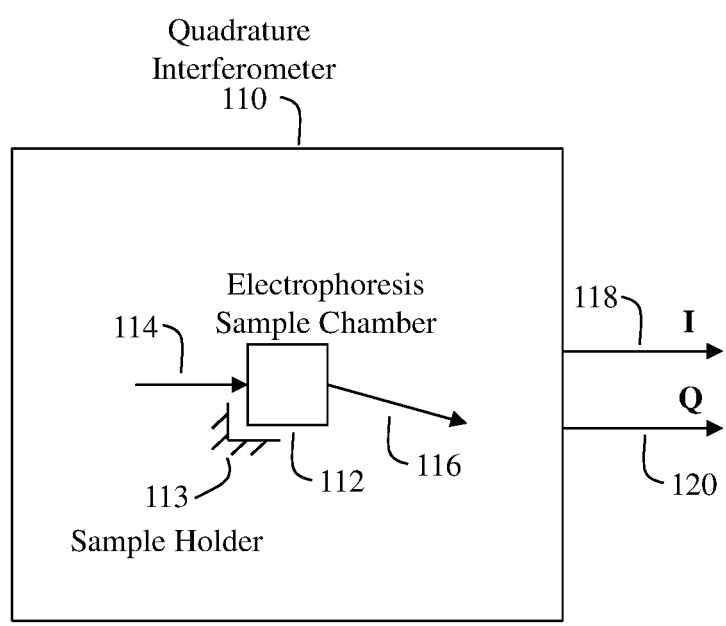
FIG. 1 shows a diagram of an apparatus of the present disclosure that may be used to aid the determination of polarity of electrophoretic mobility and zeta potential.

REFERENCE NUMERALS 110 quadrature interferometer
110A quadrature interferometer A
110B quadrature interferometer B
110C quadrature interferometer C
110D quadrature interferometer D
112 electrophoresis sample chamber
113 sample holder
114 main beam
114B 45° main beam
116 scattered light
116B 45° scattered light
118 I signal
120 Q signal
122 positive electrode
124 particle
126 particle velocity vector
128 negative electrode
130 projection velocity component
132 rejection velocity component
202 coherent polarized light source
203 s-polarized source output
203B 45° source output
204 s-polarized reference beam
204B 45° reference beam
205 quarter-wave plate
206 circularly polarized reference beam
207 non-polarizing beamsplitter
208 exiting main beam
209 beam dump
210 mirror
211 lens
212 mirror
213 redirected scattered light
213B 45° redirected scattered light
214 recombining non-polarizing beamsplitter
216 redirected circularly polarized reference beam
217 polarizing beamsplitter
218A first circular and s recombined light
218B first circular and 45° recombined light
218D first s and p recombined light
219 circular and 45° recombined light
220 I polarizer
221A I light
221B s-polarized I light
221D 45° polarized I light
222 I photodetector
224A second circular and s recombined light
224B second circular and 45° recombined light
224D second s and p recombined light
226 Q polarizer
227A Q light
227B p-polarized Q light
227D 45° polarized Q light
228 Q photodetector

DETAILED DESCRIPTION

Conventional interferometers for determining the speeds and directions of particles in electrophoresis and zeta potential instruments may use frequency shifting subsystems with moving optical components. Such subsystems may increase the size, weight, complexity, fragility, and cost of such instruments, and constrain the choice of light sources; in addition, such subsystems may limit instrument resolution and introduce an additional source of measurement errors. The apparatuses of the present disclosure overcome these disadvantages by employing an optical quadrature interferometer having a sample holder loadable with an electrophoresis sample chamber, the sample holder positioning the electrophoresis sample chamber and the particles in a path of a main beam to produce a scattered light, the optical quadrature interferometer being configured to perform optical velocimetry on the particles by using the scattered light to generate a quadrature signal comprising characteristics related to the speeds and directions of the particles. The quadrature signal may be subsequently used to determine the speeds and directions of the particles, thereby aiding the determination of magnitude and polarity of electrophoretic mobility and zeta potential of the particles.

FIG. 1 shows, in accordance with various apparatuses of the present disclosure, an optical quadrature interferometer 110 with a sample holder 113 loadable with an electrophoresis sample chamber 112. The quadrature interferometer 110 is employed as a direction-sensitive optical velocimeter to measure the speeds and directions of sample particles (not shown) contained by the electrophoresis sample chamber 112. The sample holder 113 positions the electrophoresis sample chamber 112 in a path of a main beam 114 so that the sample particles are illuminated by the main beam 114. The sample particles scatter main beam 114 light to produce scattered light 116. The quadrature interferometer 110 may recombine Doppler-shifted scattered light 116 with unshifted light from the light source. The intensity of the recombined light may fluctuate, or beat, at the Doppler shift frequencies in the scattered light 116 caused by the motion of the sample particles. In other words, a recombined light may have beat frequency variations in light intensity, and a recombined light that may have beat frequency variations in light intensity may be considered a light intensity beat signal. The quadrature interferometer 110 may select at least two different polarizations, that are separated by 90°, of recombined light, thereby producing at least a first light intensity beat signal and a second light intensity beat signal that are in quadrature phase. The first and second light intensity beat signals may be named I, for In phase signal, and Q, for Quadrature phase signal, respectively. In this application, the I and Q signals may be sinusoids, or sums of sinusoids, or sinusoids with phase noise (Lorentzians); the I signal and the Q signals may be similar, and may have similar amplitude and frequency content. However, at any frequency there may be a relative phase shift between I and Q of +90° or −90°, depending on the direction of the particles whose scattered light causes the light intensity beat signals. The two light intensity beat signals may be converted by photodetectors (not shown) into an electrical quadrature signal comprising an electrical in phase signal, I signal 118, and an electrical quadrature phase signal, Q signal 120. I signal 118 and Q signal 120 may be subjected to subsequent signal processing.

The quadrature signal may be subsequently processed using quadrature signal processing, such as may be used in conventional Doppler detection systems, like radar or sonar. For example, the quadrature signal may be interpreted as a complex number signal, with I signal 118 being the real part, and Q signal 120 being the imaginary part. If a complex Fourier transform and a corresponding power spectral density function of this complex number signal is determined over a bipolar frequency range, the magnitude of the resulting frequency spectrum will, in general, be an asymmetrical function of negative and positive frequency around 0 Hz. The amplitude of any spectral peak or indication may be proportional to the scattered light 116 intensity at its corresponding beat frequency. The magnitude of the frequency of the indication may be proportional to the speed of particles that produced the scattered light 116. The polarity of the frequency may correspond to the direction of motion of particles. Again, the direction of motion of particles may be characterized as being either positive (+) or negative (−), corresponding to particle motion in either the same or the opposite direction of the applied electric field, for example. Therefore, the frequency spectrum may represent a spectrum of particle speeds in negative and positive directions.

The spectrum of negative and positive particle speeds may then be used, in a conventional manner, to calculate distributions of negative and positive electrophoretic mobilities and zeta potentials.

The quadrature interferometer 110 does not require the continuously moving optical parts of a conventional optical phase modulator or frequency shifter, and therefore may be characterized as having nominally stationary optics.

Although a prior-art heterodyne interferometer velocimeter incorporating a phase modulator or frequency shifter is able to determine electrophoretic mobility polarity and zeta potential polarity, it may suffer from certain disadvantages. For example, incorporating a phase modulator or frequency shifter into a velocimeter may require the addition of many parts, including an optical part such as a mirror or reflector, a piezoelectric actuator, a precision displacement sensor, and associated position sensing, drive and control electronics. These additional parts may make the instrument larger, heavier, more fragile, and less reliable than is desired in certain applications. The additional parts may routinely require additional time and effort for calibration thereby adding to manufacturing costs and lead time.

Furthermore, to the extent that the additional optical part unbalances the optical path length matching between the measurement or main arm and the reference arm, a longer coherence length may be required for the interferometer light source. Optical path length imbalances that are unchanging can be compensated for by adding fixed compensating optical elements to lengthen a short optical path in one arm; however, a phase modulator or frequency shifter may continuously vary an optical path in one arm length during operation. If a reflector, for instance, moves 200 μm (μm=micrometers), the path length may effectively change by 400 μm (that is, the path length change may be doubled due to the round trip path of light). This exceeds the coherence length of many simple laser diodes, and may necessitate the use of an external-cavity diode laser configuration to obtain a suitably larger coherence length, which may further increase the size, weight, complexity, and cost of an instrument.

There may be other disadvantages to the use of a phase modulator or frequency shifter in a prior-art heterodyne interferometer velocimeter. For example, a consequence of the use of a linear frequency shifter is that the maximum electric field on time is bounded by the maximum time $t_{max}$ that such a shifter's reflector may take to travel from one end of its linear travel path to the other. This limits the frequency resolution of any frequency spectrum that is generated to $1/t_{max}$. Finally, phase modulators or frequency shifters may suffer from bias, random, and linearity errors, as well as added susceptibility to vibration artifacts.

Therefore, it may be beneficial, especially in miniaturized, ruggedized, or low-cost instruments, to eliminate the additional optical and electronics hardware associated with conventional phase modulators and frequency shifters, and relax coherence length constraints on light sources, while still providing an unambiguous determination of the sign of electrophoretic mobility and zeta potential.

The electrophoresis sample chamber 112 may comprise a vessel that is capable of receiving and holding the sample particles to be characterized in a sample medium, and that is typically loadable to and removable from the sample holder 113 of quadrature interferometer 110. The vessel may be a windowed sample container, a sample plate, or sample tray. The mixture of the sample particles and the sample medium may constitute a colloid. The sample medium may be a liquid or fluid, a gel, or a gas. The electrophoresis sample chamber 112 may use electrodes to apply an electric field having known magnitude and direction to the sample medium and the particles or sample that is to be characterized. The particles, because of their electrostatic charges, may be compelled to move under the influence of the electric field. The electrophoresis sample chamber 112 may be inserted into and held by the sample holder 113 in such a way that particles in the sample fluid are illuminated by the interferometer's main beam 114. Main beam 114 light may be scattered and Doppler-shifted by the moving particles. The Doppler-shifted scattered light 116 may exit electrophoresis sample chamber 112 to be recombined with reference beam light in quadrature interferometer 110.

The sample holder 113 comprises a mechanical mount adapted to be loadable with the electrophoresis sample chamber 112, to hold the electrophoresis sample chamber 112 so that particles contained by electrophoresis sample chamber 112 may be illuminated by main beam 114, and to allow the scattered light 116 to be received by quadrature interferometer 110 and subsequently recombined with reference beam light. The particular design, shape, and dimensions of sample holder 113 may be adapted to the particular design, shape, and dimensions of the electrophoresis sample chamber 112 to be accommodated. Sample holder 113 may comprise, for example, a clasp, sheath, bracket or cutout having a void with approximately the same cross-sectional shape and contours (for example, circular or rectangular) as the external surface of electrophoresis sample chamber 112. Sample holder 113 may further comprise springs or resilient stays to ease the loading and removal of electrophoresis sample chamber 112, and electrical contacts for providing stimulus to electrodes of electrophoresis sample chamber 112, for example (not shown).

Figure 1A:
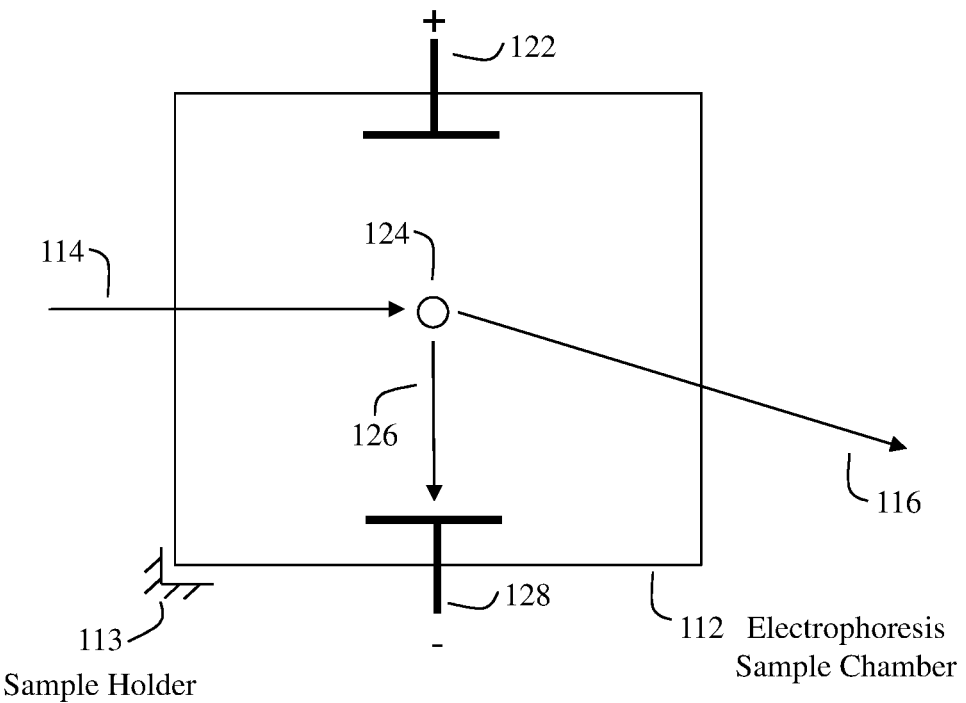
FIG. 1A shows a more detailed schematic diagram of an example of the electrophoresis sample chamber of FIG. 1.
Figure 1B:
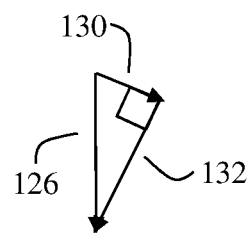
FIG. 1B shows a vector diagram.

FIGS. 1A and 1B illustrate in more detail the manner in which a Doppler shift of the scattered light 116 may occur in the electrophoresis sample chamber 112. FIG. 1A shows a more detailed schematic diagram of an example of the electrophoresis sample chamber 112 of FIG. 1. The electrophoresis sample chamber 112 is held by sample holder 113 so that a particle 124 is illuminated by the main beam 114. The particle 124, when illuminated by the main beam 114, may produce scattered light in all directions, to some extent, including the direction of scattered light 116. The electrophoresis sample chamber 112 may include a positive electrode 122 and a negative electrode 128, for example, which may induce an electric field that compels a positively charged particle 124 to drift in the direction indicated by particle velocity vector 126, for example.

FIG. 1B shows a vector diagram illustrating the projection of particle velocity vector 126 onto a line oriented at the same angle as that of scattered light 116. The resultant projection vector is a projection velocity component 130, which is the component of particle velocity vector 126 that is in the same direction as the scattered light 116. The projection velocity component 130 may cause a Doppler frequency shift in scattered light 116 (in contrast, the orthogonal rejection velocity component 132 may not contribute to Doppler shift in the direction of scattered light 116). In this example, since particle 124 effectively has a component of motion (projection velocity component 130) in the direction of the propagation of scattered light 116, the frequency of scattered light 116 may be increased slightly with respect to the light frequency of unscattered main beam 114, in proportion to the length of projection velocity component 130.

It follows that the angle of the scattered light 116 beam used by quadrature interferometer 110 should preferably not be selected so that the scattered light 116 beam is orthogonal, or at 90°, to particle velocity vector 126, else electrophoretic particle drift may produce no Doppler shift in scattered light 116; it also follows that, for a given particle drift speed, the Doppler shift will increase as the angle between the scattered light 116 beam and particle velocity vector 126 decreases, with a theoretical maximum Doppler shift at a separation of 0°.

FIGS. 2A, 2B, 2C, 2D show detailed optical diagrams of various aspects of the apparatus of FIG. 1. The optical interferometers of these examples may comprise variations of a quadrature Mach Zehnder interferometer. Such a quadrature Mach Zehnder interferometer may comprise a Mach Zehnder interferometer adapted to include a sample holder for holding a electrophoresis sample chamber in a main beam of the interferometer, and further adapted to generate a quadrature signal that comprises characteristics related to the speeds and directions of the particles under study. In the optical diagrams of the examples, the optical components are generally located in a single plane, which will be referred to as the plane of the interferometer. Polarized optical component means, comprising, for example, such polarized optical components as polarizers, polarized beamsplitters, and the like, may be used to select various polarizations of light in the apparatuses of the present disclosure. The polarization of light is indicated in a conventional manner, using the following labels: a dot with a circle indicates linear s-polarization with respect to the system optics, a vertical arrow indicates linear p-polarization, the combination of these two symbols indicates a linear polarization that is a combination of s- and p-polarization, a tilted arrow together with a dot with a circle indicates linear polarization with orientation at approximately 45° with respect to the plane of the interferometer, and an arced arrow indicates circular polarization.

Figure 2A:
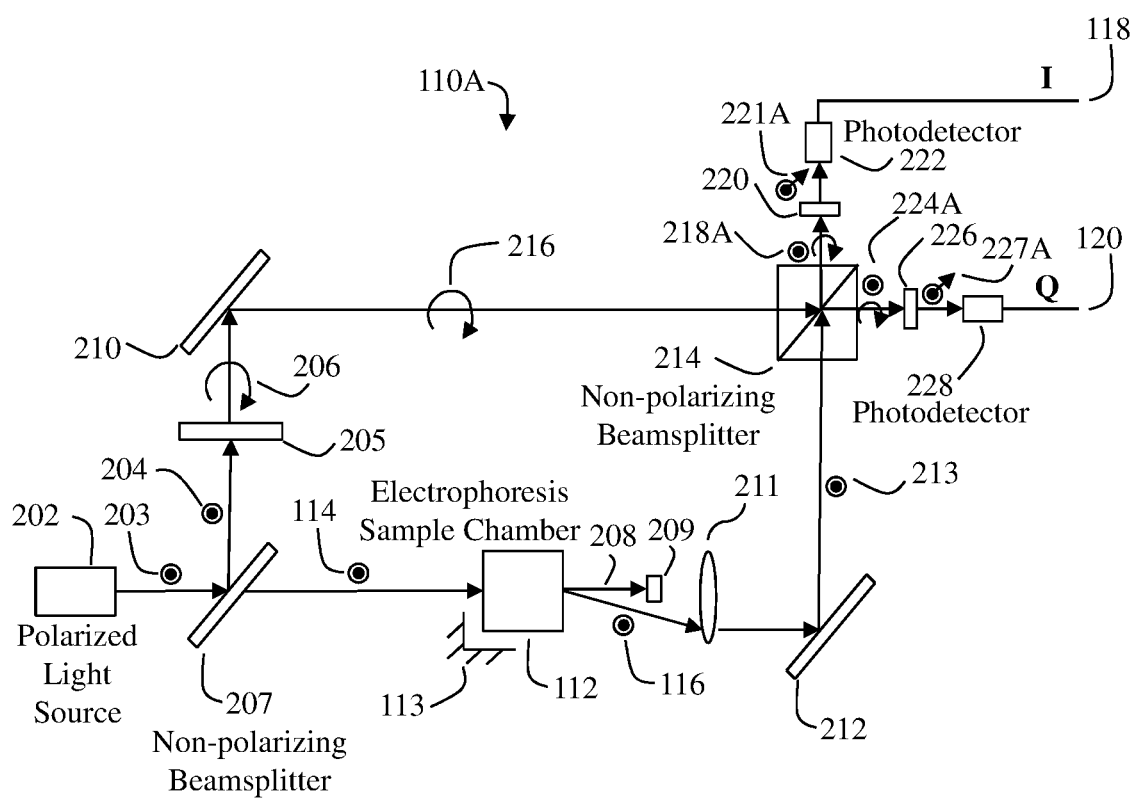
FIG. 2A shows a detailed schematic diagram of a first aspect of the apparatus of FIG. 1.

Referring to FIG. 2A, a first detailed schematic diagram of an aspect of the present disclosure is shown.

In FIG. 2A, a coherent polarized light source 202 is shown with its output s-polarized; that is, the electric field is perpendicular to the plane of the interferometer or the plane of the drawing, and parallel to the entrance and exit surfaces of the optical components of the interferometer. In some applications, this polarization may produce a stronger scattered light intensity, especially for lower ratios of particle diameter to source light wavelength, since the strongest scattering may occur in a direction orthogonal to the electric field. However, this is just one example, and the output of coherent polarized light source 202 may have other linear polarizations, ranging from s-polarization to p-polarization (not shown). Coherent polarized light source 202 may be, for example, a linearly polarized laser, which has a constant orientation of linear polarization; in an aspect of the disclosure, this may result in a linearly polarized main beam 114.

In FIG. 2A, light from coherent polarized light source 202 is split by a non-polarizing beamsplitter 207 into two beams: an s-polarized reference beam 204 and main beam 114. Main beam 114 is used to illuminate particles in electrophoresis sample chamber 112, resulting in scattered light 116. Scattered light 116 and light originating from reference beam 204 are recombined and further modified by recombining optics. In the quadrature interferometer A 110A of FIG. 2A, the recombining optics comprise non-polarizing beamsplitter 214. Recombined lights modified to have polarizations in quadrature phase are coupled to at least a first photodetector and a second photodetector comprising I photodetector 222 and Q photodetector 228, respectively. Respective outputs of the first and second photodetectors may be electrical signals in quadrature, and signal processing of said electrical signals may be used to determine the speeds and directions of particles undergoing electrophoresis. FIG. 2A will be discussed in more detail below.

Figure 2B:
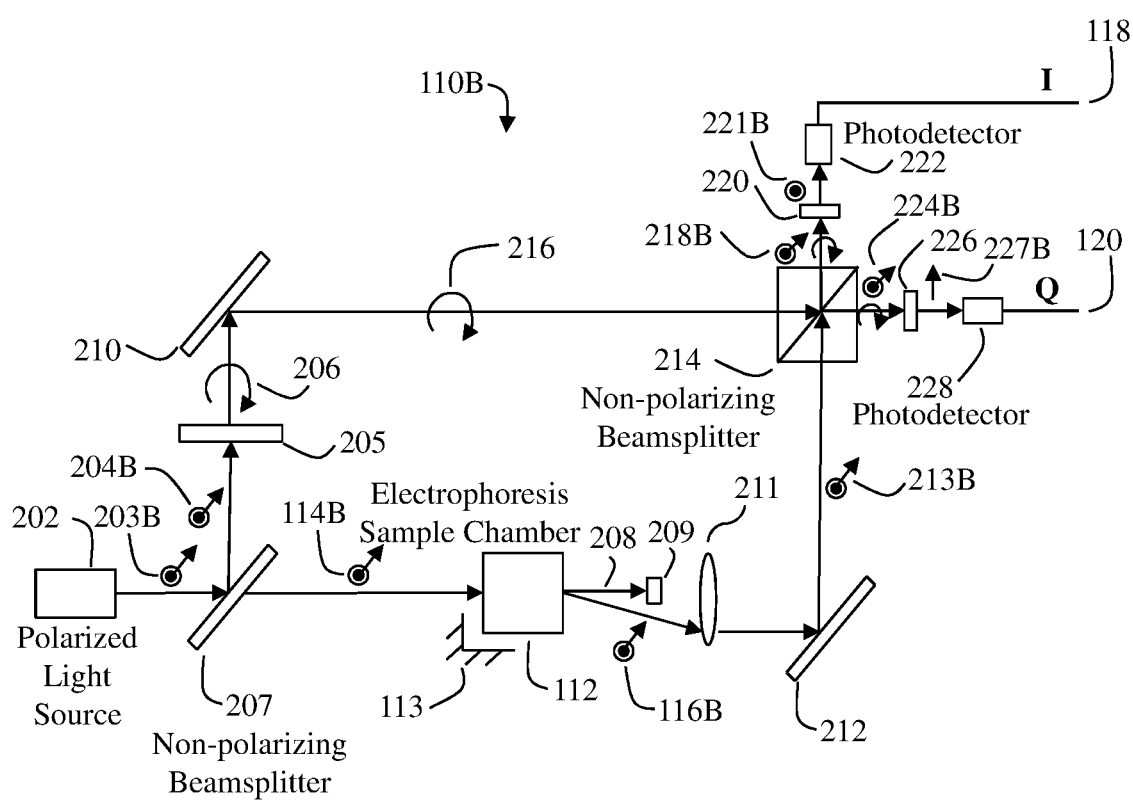
FIG. 2B shows a detailed schematic diagram of a second aspect of the apparatus of FIG. 1.
Figure 2C:
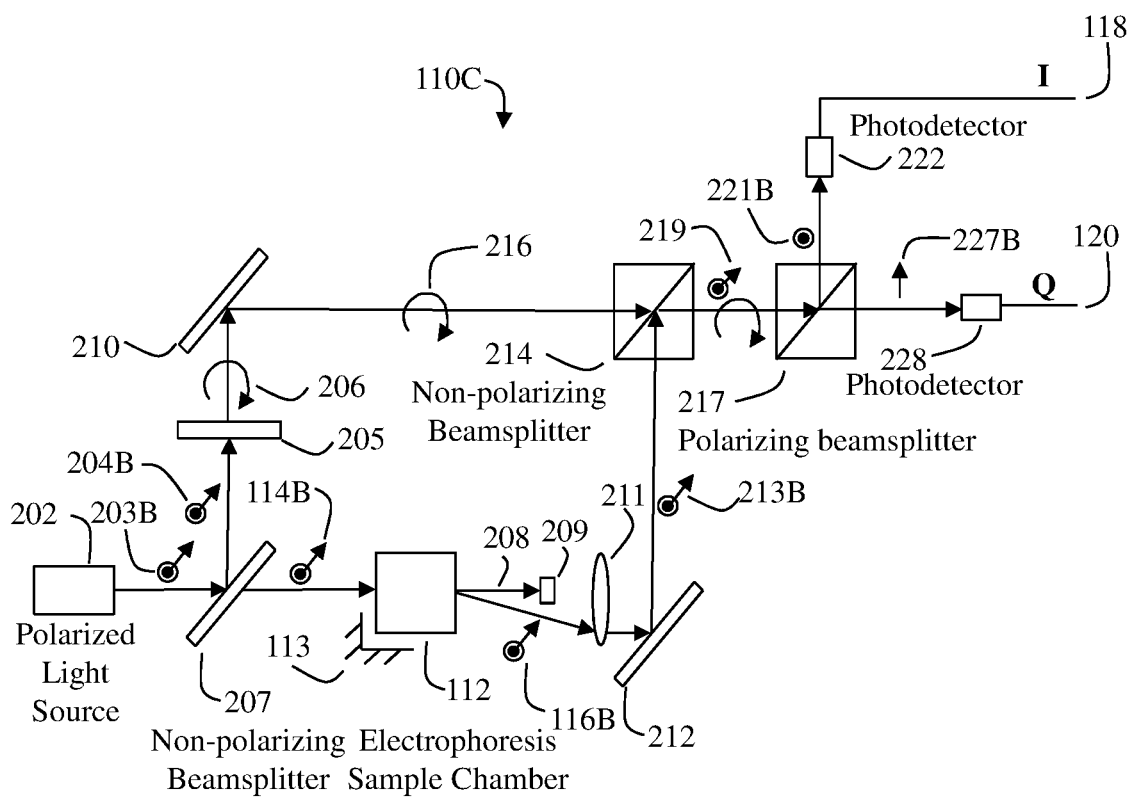
FIG. 2C shows a detailed schematic diagram of a third aspect of the apparatus of FIG. 1.
Figure 2D:
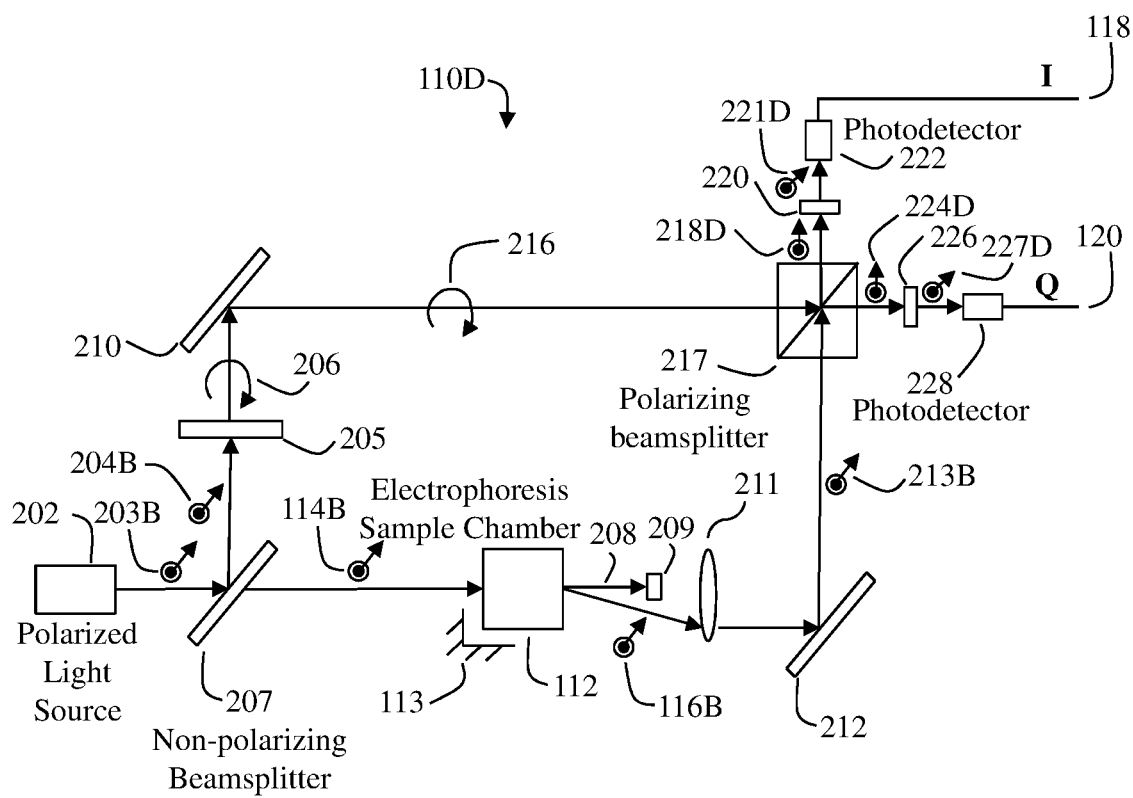
FIG. 2D shows a detailed schematic diagram of a fourth aspect of the apparatus of FIG. 1.

In the quadrature interferometer A 110A of FIG. 2A, as well as in the quadrature interferometers B, C, D (110B, 110C, 110D) of FIGS. 2B, 2C, 2D, light in one arm of an optical interferometer is made to simultaneously contain two substantially orthogonal polarizations of light in quadrature time phase. These conditions are manifested as circularly polarized light, and are preserved at least to the point in the optical train at which the two polarization components are ultimately split. In the examples given here, reference beam light, vs. main beam light, is assumed to have circular polarization, but, in general, either main beam light or the reference beam could be circularly polarized. After the light of main beam 114 interacts with particles in electrophoresis sample chamber 112, producing scattered light 116, scattered light 116 is combined with reference beam light. At least two different combinations of light, each having predominantly only one of two orthogonal polarizations in quadrature phase, are produced at the optical output of the interferometer. The result is that the quadrature interferometer produces two optical signals in quadrature phase.

As mentioned above, the light in the arm of the quadrature interferometer that simultaneously contains two substantially orthogonal polarizations of light in quadrature time phase will be recognized by those skilled in the art as being circularly polarized. The electric field of circularly polarized light consists of the summation of two orthogonally polarized electric field components—for example, a vertically polarized component Ev, and a horizontally polarized component Eh—that have a 90 degree phase shift in time between them. At any given position along the propagation axis of the light wave, the combined instantaneous electric field has a constant amplitude vs. time. However, the direction of the combined electric field (equivalent to the polarization of the wave) sweeps linearly at 2π radians per period. The electric field vector tip therefore traces a circular path—hence, the term "circular polarization".

As is known in the art, circular polarization may be produced by passing linearly polarized light through a quarter-wave plate, or retarder plate, if the principal axis of the quarter-wave plate is oriented at an approximately 45 degree angle with respect to the axis of polarization of a linearly polarized light. As mentioned above, in FIGS. 2A, 2B, 2C, 2D, reference beam light, vs. main beam light, is assumed to have circular polarization. However, in general, either main beam light or the reference beam could be circularly polarized. For example, a quarter-wave plate could be placed in the path of a main beam originating from a coherent polarized light source 202 whose polarization is linear, thereby generating circularly-polarized main beam light (not shown). Alternately, a coherent polarized light source 202 with circular polarization could be employed; in this case a polarizer could be placed in the path of the reference beam to render it linearly-polarized before recombination with scattered light (not shown).

Referring again to FIG. 2A, a more detailed description of the schematic will now be given. Quadrature interferometer A 110A uses circularly polarized light to produce the desired quadrature signal output comprising I signal 118 and Q signal 120. Here, coherent polarized light source 202 has an s-polarized source output 203. Consequently, s-polarized reference beam 204, main beam 114, scattered light 116, and redirected scattered light 213 are all substantially s-polarized. Reference beam 204 is passed through a quarter-wave plate 205, with an approximately 45 degree angular displacement between the polarization angle of reference beam 204 and either the slow or fast axis of quarter-wave plate 205. The result is a circularly polarized reference beam 206. In general, circularly polarized reference beam 206 may be either right-hand-circularly (RHC) polarized or left-hand-circularly (LHC) polarized. This beam is redirected by a mirror 210 to form a redirected circularly polarized reference beam 216. Main beam 114 may be much more intense than reference beam 204. Main beam 114 enters electrophoresis sample chamber 112; main beam 114 may also pass through electrophoresis sample chamber 112 and exit as a transmitted main beam 208, and transmitted main beam 208 may be discarded in a beam stop 209. Sample particles (not shown) contained by electrophoresis sample chamber 112 are compelled by the application of a known electric field to drift in the electrophoresis sample chamber, in a manner known to those skilled in the art. The particles are illuminated by main beam 114, and produce Doppler-shifted scattered light 116. Scattered light 116 may be confined to that of a particular range of scattering angle by an aperture (not shown). Scattered light 116 may have frequency lower or higher than that of main beam 114, depending, in part, on whether the drift velocity of the particles is in the same or in the opposite direction of the applied electric field. Scattered light 116 may be focused by lens 211 and re-directed by mirror 212 to form a re-directed scattered light 213.

Redirected circularly polarized reference beam 216 and redirected scattered light 213 are recombined by recombining non-polarizing beamsplitter 214. Redirected circularly polarized reference beam 216 enters a first face of recombining non-polarizing beamsplitter 214. Re-directed scattered light 213 enters a second face of recombining non-polarizing beamsplitter 214. Recombining non-polarizing beamsplitter 214 combines the incoming light 216, 213 and splits it into two output beams, a first circular and s recombined light 218A and a second circular and s recombined light 224A. These lights 218A, 224A have components of both linear polarized scattered light and circularly polarized reference beam light. Lights 218A, 224A pass through polarizers 220, 226, respectively, and produce an I light 221A and a Q light 227A, respectively. The polarization axis of each polarizer 220, 226 is oriented at approximately 45° with respect to the polarization axis of redirected scattered light 213, and the polarization axes of polarizers 220, 226 are separated by approximately 90°. If the particles that produce scattered light 116 are drifting, light from reference beam 216 and redirected scattered light 213 may combine and beat to produce non-zero beat frequencies in the intensity of both I light 221A and Q light 227A that are proportional to particle drift speeds (particle speeds may be affected by sample chamber electroosmosis and Brownian motion, amongst other effects, as mentioned above). However, the light intensity beat signal comprising I light 221A and the light intensity beat signal comprising Q light 227A may be in quadrature. I light 221A and Q light 227A may illuminate an I photodetector 222 and a Q photodetector 228, respectively, which may produce electrical quadrature signals I signal 118 and Q signal 120, respectively.

Referring to FIG. 2B, a detailed schematic diagram of a second aspect of the apparatus of FIG. 1 is shown. The apparatus of FIG. 2B is similar to that of FIG. 2A, except that four components may be rotated approximately 45° with respect to their angular orientation in FIG. 2A. These four components are the coherent polarized light source 202, the quarter-wave plate 205, and the polarizers 220, 226. The net effect of these changes is to rotate the angle of the polarization of the linearly polarized light in quadrature interferometer B 110B by approximately 45° with respect to that of quadrature interferometer A 110A. This illustrates how the angle of polarization of main beam light may be adjusted, for the purpose of optimizing scattered light amplitude, for example.

In FIG. 2B the angle of polarization of the coherent polarized light source 202 is rotated by 45° with respect to the angle of polarization in FIG. 2A, so that the polarization angle of 45° source output 203B is oriented at approximately 45° to the plane of the interferometer. Consequently, 45° reference beam 204B, 45° main beam 114B, 45° scattered light 116B, and 45° re-directed scattered light 213B also have linear polarization angle oriented at approximately 45° to the plane of the interferometer, as indicated by the tilted arrows in FIG. 2B. To accommodate these angular changes and still produce a quadrature signal output, the remaining polarization-sensitive optical components, including quarter-wave plate 205 and polarizers 220, 226, must be rotated 45° with respect to those of quadrature interferometer A 110A. As in quadrature interferometer A 110A, in a quadrature interferometer B 110B the polarization axis of each polarizer 220, 226 is oriented at approximately 45° with respect to the polarization axis of 45° redirected scattered light 213B, and the polarization axes of polarizers 220, 226 are separated by approximately 90°. This may produce, for example, s-polarized I light 221B and p-polarized Q light 227B, which illuminate I photodetector 222 and Q photodetector 228, respectively. Beat frequencies in the intensity of light 221B, 227B may then again be manifested in I and Q signals 118, 120.

Referring to FIG. 2C, a detailed schematic diagram of a third aspect of the apparatus of FIG. 1 is shown. Up to the point where light exits recombining non-polarizing beamsplitter 214, the optical components of a quadrature interferometer C 110C, and their angular orientation, are essentially identical to those of the quadrature interferometer B 110B. However, in the quadrature interferometer C 110C, only one exit beam from recombining non-polarizing beamsplitter 214 may be used. Circular and 45° recombined light 219 is directed to a polarizing beamsplitter 217. A polarization axis of polarizing beamsplitter 217 may be oriented at approximately 45° with respect to the polarization axis of 45° redirected scattered light 213B. This may produce, for example, s-polarized I light 221B and p-polarized Q light 227B, which illuminate I photodetector 222 and Q photodetector 228, respectively. Beat frequencies in the intensity of light 221B, 227B will be manifested in I and Q signals 118, 120, as before.

Referring to FIG. 2D, a detailed schematic diagram of a fourth aspect of the apparatus of FIG. 1 is shown. Up to the point in the optical train where lights 216, 213B are recombined, the optical components of a quadrature interferometer D 110D, and their angular orientation, are essentially identical to those of the quadrature interferometers B and C (110B, 110C). However, in quadrature interferometer D 110D, redirected circularly polarized reference beam 216 and 45° re-directed scattered light 213B are recombined by a recombining polarizing beamsplitter 217, producing two exit beam lights. Here, a polarization axis of polarizing beamsplitter 217 may be oriented at approximately 45° with respect to the polarization axis of 45° redirected scattered light 2138.

Note that the polarization of light exiting a polarizing beamsplitter depends upon, at least, both
a. which face of the polarizing beamsplitter a light enters, and
b. which face of the polarizing beamsplitter the light exits.

Swapping either the entrance face or the exit face may toggle the polarization of exiting light. Hence, in FIG. 2D, the light exiting polarizing beamsplitter 217 towards the top of the page (comprising I signal light), may comprise s-polarized light entering its left face and p-polarized light entering its bottom face. Conversely, the light exiting polarizing beamsplitter 217 towards the right of the page (comprising Q signal light), may comprise p-polarized light entering its left face and s-polarized light entering its bottom face.

Consequently, a first s and p recombined light 218D may comprise the s-polarized component of redirected circularly polarized reference beam 216 and the p-polarized component of 45° re-directed scattered light 2138. A second s and p recombined light 224D may comprise the p-polarized component of redirected circularly polarized reference beam 216 and the s-polarized component of 45° re-directed scattered light 2138. Since the polarization components in each of 218D, 224D are orthogonal, interference cannot occur between those components. Therefore, polarizers 220, 226, are employed to select like polarizations from the orthogonal polarization components of 218D, 224D, respectively, so that interference may occur. Polarizers 220, 226 are oriented with polarization axis at approximately 45° to the plane of the interferometer, which means that each of their polarization axes are oriented at approximately 45° with respect to the polarization axis of a scattered light component (that is, a component of 45° redirected scattered light 213B) of lights 218D, 224D, respectively, that exit beamsplitter 217. Also, similarly to in the quadrature interferometers A and B (110A, 110B), the polarization axes of polarizers 220, 226 are separated by approximately 90°. This produces 45° polarized I light 221D and 45° polarized Q light 227D, which impinge on I photodetector 222 and Q photodetector 228, respectively. Beat frequencies in the intensity of light 221B, 227B may be manifested in I and Q signals 118, 120, as before.

In the quadrature interferometers B, C, D (110B, 110C, 110D), the polarization of said light source was described as being linear and oriented at approximately 45° to the plane of said interferometer, but this is just an example; other light source linear polarization angular orientations ranging in a continuum from s-polarized to p-polarized are possible.

The quadrature interferometers A and B (110A, 110B) have several advantageous aspects, partly because they use two polarizers 220, 226, together with a recombining non-polarizing beamsplitter 214, versus a single polarizing beamsplitter 217, to generate quadrature signals 118, 120. The separate polarizers 220, 226 may have relatively high extinction ratios at a relatively low cost. For example, a 0.5 inch by 0.5 inch dichroic film polarizer with extinction ratio of 5000:1 is commercially available for $0.50 at the time of this writing. High extinction ratios allow better separation of I light 221A and Q light 227A and, consequently, more accurate quadrature balance. Having separate polarizers may also allow more flexibility in adjusting quadrature balance, by allowing the rotation of the polarizers 220, 226 to be adjusted separately. In addition, the quadrature interferometer A 110A may have a higher intensity of scattered light 116 due to the s-polarized orientation of main beam 114.

The quadrature interferometer C 110C may have the advantageous aspect that, nominally, more of the power of scattered light 116B may be delivered to the photodetectors 222, 228 than for the quadrature interferometers A, B, D (110A, 110B, 110D). In practice, the actual fraction of scattered light 116 delivered to photodetectors 222, 228 may depend upon the reflection efficiency and transmission efficiency, respectively, of polarizing beamsplitter 217 (as well as the efficiency of recombining non-polarizing beamsplitter 214), and may always be somewhat less than 100%. However, the fraction of power of scattered light delivered to the photodetectors in the quadrature interferometer C 110C may exceed the approximately ½ delivered in quadrature interferometers A, B, D (110A, 110B, 110D).

SUMMARY

Each of the four example quadrature interferometers of FIGS. 2A, 2B, 2C, 2D performs a similar function, in that each will nominally produce quadrature I and Q signals 118, 120, that may, in turn, be used to help determine the speeds and directions of particles in an electrophoresis sample chamber 112. The four examples illustrate that quadrature interferometer 110 may be implemented with various optical hardware designs that are different in detail, but are substantially similar in function.

Many advantageous aspects accrue from the fact that the apparatuses of the present disclosure eliminate the use of a phase modulator or a frequency shifter. Therefore, the apparatuses of the present disclosure incorporate no continuously moving optical components, and, furthermore, have none of the extra electronic and mechanical support hardware typically associated with the use of a phase modulator or a frequency shifter.

Consequently, the apparatuses of the present disclosure may be smaller, lighter, more durable, more reliable, and less susceptible to vibration than conventional instruments. The apparatuses of the present disclosure may also be less expensive than conventional instruments, in part due to the elimination of phase modulator or frequency shifter optical hardware and associated electronic hardware.

Furthermore, the apparatuses of the present disclosure are not subject to any added scaling errors, bias errors, random errors, linearity errors, or any other errors that might be associated with the phase modulators and frequency shifters of conventional instruments.

Another reason that the apparatuses of the present disclosure may be smaller, lighter, and less expensive than conventional instruments is that they may be able to employ a coherent polarized light source 202 having a shorter coherence length. Coherent polarized light source 202 may be a laser, for example, or another source that has a sufficient coherence length. Coherent polarized light source 202 may also constructed by placing a polarizer (not shown) in the output path of a non-polarized light source. As discussed above, the coherence length of the light from coherent polarized light source 202 must be at least equal to any optical path length difference between the main and reference beam optical paths. In conventional instruments, in which the optical path length of one arm changes during operation, the coherence length must be, at least, greater than the maximum optical path length change. This requirement may necessitate the use of an external-cavity diode laser configuration, for example, to achieve a larger coherence length. Since the apparatuses of the present disclosure do not use a phase modulator or frequency shifter, the matching between the optical path lengths of the main beam and reference beam arms nominally tends to be better than that of conventional devices, and any fixed path length differences may be reduced by inserting compensating optical elements (not shown). Furthermore, the optical path lengths of the apparatuses of the present disclosure are nominally fixed—they do not vary during operation. Therefore, the coherence length specification of coherent polarized light source 202 may be relaxed relative to that required for an interferometer that incorporates a phase modulator or frequency shifter. The light from coherent polarized light source 202 may have a coherence length of less than about 20 mm, or less than about 2 mm, or less than about 500 µm. Consequently, a wider variety of light sources, some having lower size, weight, complexity, and cost, may be used for coherent polarized light source 202.

All of these aspects may be advantageous for miniature or low-cost instruments.

Another advantageous aspect of the apparatuses of the present disclosure concerns the duration or length of contiguous photodetector signal data records (that is, of I signal 118 and Q signal 120). A conventional instrument with a linear frequency shifter, for example, can only collect data records of limited duration, due to the limited span of travel of the frequency shifter optical element. The limited duration imposes a theoretical limit on the frequency resolution of a spectrum determined for such data records. The aspects disclosed herein are not subject to this limitation, and so may allow the acquisition of longer contiguous photodetector signal data records, which, ultimately, may allow greater frequency resolution in spectra.

Although the description above contains many specificities, these should not be construed as limiting the scope of the embodiments but as merely providing illustrations of some of aspects of the present disclosure. For example, regarding the particular optical quadrature interferometers diagrammed herein, based upon the principles illustrated by the disclosed aspects, other arrangements and types of optical components, including different configurations of polarizers, polarizing beam splitters, and free-space or fiber optic components, and apertures, lenses, and mirrors, for instance, may be used to construct a optical quadrature interferometer 110 that is usable with an electrophoresis sample chamber 112.

The present disclosure generally illustrates the use of one pair of quadrature signals, but aspects of the present disclosure may be also used with multiple pairs of independent quadrature signals collected at the same or different scattering angles, in techniques such as Massively-Parallel Phase Analysis Light Scattering (MP-PALS), for example.

Thus, the scope of the embodiments should be determined by the appended claims and their legal equivalents, rather than by the examples given.

I claim:

1. A device for measuring speeds and directions of particles undergoing electrophoresis in an electrophoresis sample chamber, comprising:

an optical quadrature interferometer having a sample holder loadable with the electrophoresis sample chamber, the sample holder positioning the electrophoresis sample chamber and the particles in a path of a main beam to produce a scattered light, the optical quadrature interferometer being configured to perform optical velocimetry on the particles by using the scattered light to generate a quadrature signal comprising characteristics related to the speeds and directions of the particles, and signal processing means for acquiring a data record of the quadrature signal and determining a frequency spectrum of the data record, the data record having a length corresponding to a duration of the acquiring, whereby a frequency resolution of the frequency spectrum is dependent upon the duration of the acquiring, and the frequency spectrum is used to determine the speeds and directions of the particles, thereby aiding the determination of magnitude and polarity of electrophoretic mobility and zeta potential of the particles.

2. The device of claim 1, wherein said optical quadrature interferometer comprises a quadrature Mach Zehnder interferometer.

3. The device of claim 1, wherein said optical quadrature interferometer further comprises:

a coherent polarized light source that is substantially linearly polarized;

a splitter illuminated by the coherent polarized light source that produces the main beam and a reference beam;

a retarder plate illuminated by the reference beam that produces a circularly polarized reference beam;

a recombiner that recombines the circularly polarized reference beam with the scattered light to produce a recombined light;

at least one polarized optical component that selects from the recombined light at least a first light intensity beat signal and a second light intensity beat signal, the first and second light intensity beat signals being optical signals in quadrature that comprise beat frequency variations in light intensity;

a first photodetector illuminated by said first light intensity beat signal, the first photodetector producing an electrical in phase signal; and a second photodetector illuminated by said second light intensity beat signal, the second photodetector producing an electrical quadrature phase signal;

whereby the quadrature signal comprises the electrical in phase signal and the electrical quadrature phase signal.

4. The device of claim 1, wherein said optical quadrature interferometer further comprises:

means for splitting and modifying a light from a coherent polarized light source to generate a linearly polarized main beam and a circularly polarized reference beam, said main beam illuminating said particles, thereby producing a scattered light; means for recombining said scattered light with said circularly polarized reference beam, thereby producing a recombined light; polarized optical component means for selecting from said recombined light at least a first light intensity beat signal and a second light intensity beat signal, said first and second light intensity beat signals being optical signals in quadrature that comprise beat frequency variations in light intensity; a first photodetector illuminated by said first light intensity beat signal; and a second photodetector illuminated by said second light intensity beat signal;

whereby respective outputs of said first and second photodetectors comprise electrical signals in quadrature.

5. The device of claim 1, wherein said optical quadrature interferometer further comprises:

a coherent polarized light source that is approximately s-polarized;

a beamsplitter illuminated by said coherent polarized light source, said beamsplitter splitting an output of said light source into a main beam and a reference beam, said main beam illuminating said particles and producing a scattered light;

a quarter-wave plate illuminated by said reference beam, said quarter-wave plate producing a circularly polarized reference beam;

a recombining non-polarizing beamsplitter illuminated by and recombining said scattered light and said circularly polarized reference beam to produce a recombined light, and splitting the recombined light into a first light and a second light;

a first polarizer illuminated by said first light;

a second polarizer illuminated by said second light;

a polarization axis of each said polarizer being oriented at approximately 45° with respect to a polarization axis of said scattered light, polarization axes of said first polarizer and said second polarizer being separated by approximately 90°, a light exiting said first polarizer being a first light intensity beat signal, a light exiting said second polarizer being a second light intensity beat signal, said first and second light intensity beat signals being optical signals in quadrature that comprise beat frequency variations in light intensity;

a first photodetector illuminated by said first light intensity beat signal, the first photodetector producing an electrical in phase signal; and a second photodetector illuminated by said second light intensity beat signal, the second photodetector producing an electrical quadrature phase signal;

whereby the quadrature signal comprises the electrical in phase signal and the electrical quadrature phase signal.

6. The device of claim 1, wherein said optical quadrature interferometer further comprises:

a coherent polarized light source that is substantially linearly polarized;

a beamsplitter illuminated by said coherent polarized light source, said beamsplitter splitting an output of said light source into a main beam and a reference beam, said main beam illuminating said particles and producing a scattered light;

a quarter-wave plate illuminated by said reference beam, said quarter-wave plate producing a circularly polarized reference beam;

a recombining non-polarizing beamsplitter illuminated by and recombining said scattered light and said circularly polarized reference beam to produce a recombined light, and splitting the recombined light into a first light and a second light;

a first polarizer illuminated by said first light;

a second polarizer illuminated by said second light;

a polarization axis of each said polarizer being oriented at approximately 45° with respect to a polarization axis of said scattered light, polarization axes of said first polarizer and said second polarizer being separated by approximately 90°, a light exiting said first polarizer being a first light intensity beat signal, a light exiting said second polarizer being a second light intensity beat signal, said first and second light intensity beat signals being optical signals in quadrature that comprise beat frequency variations in light intensity;

a first photodetector illuminated by said first light intensity beat signal, the first photodetector producing an electrical in phase signal; and a second photodetector illuminated by said second light intensity beat signal, the second photodetector producing an electrical quadrature phase signal;

whereby the quadrature signal comprises the electrical in phase signal and the electrical quadrature phase signal.

7. The device of claim 6, wherein an angle of polarization of said coherent polarized light source is approximately 45° with respect to a plane of said optical quadrature interferometer.

8. The device of claim 1, wherein said optical quadrature interferometer further comprises:

a coherent polarized light source that is substantially linearly polarized;

a beamsplitter illuminated by said coherent polarized light source, said beamsplitter splitting an output of said light source into a main beam and a reference beam, said main beam illuminating said particles and producing a scattered light;

a quarter-wave plate illuminated by said reference beam, said quarter-wave plate producing a circularly polarized reference beam;

a recombining non-polarizing beamsplitter illuminated by and recombining said scattered light and said circularly polarized reference beam to produce a recombined light;

a polarizing beamsplitter illuminated by said recombined light, a polarization axis of said polarizing beamsplitter being oriented at approximately 45° with respect to a polarization axis of said scattered light, a light exiting a first face of said polarizing beamsplitter being a first light intensity beat signal, a light exiting a second face of said polarizing beamsplitter being a second light intensity beat signal, said first and second light intensity beat signals being optical signals in quadrature that comprise beat frequency variations in light intensity;

a first photodetector illuminated by said first light intensity beat signal, the first photodetector producing an electrical in phase signal; and a second photodetector illuminated by said second light intensity beat signal, the second photodetector producing an electrical quadrature phase signal;

whereby the quadrature signal comprises the electrical in phase signal and the electrical quadrature phase signal.

9. The device of claim 1, wherein said optical quadrature interferometer further comprises:
a coherent polarized light source that is substantially linearly polarized;
a beamsplitter illuminated by said coherent polarized light source, said beamsplitter splitting an output of said light source into a main beam and a reference beam, said main beam illuminating said particles and producing a scattered light;
a quarter-wave plate illuminated by said reference beam, said quarter-wave plate producing a circularly polarized reference beam;
a polarizing beamsplitter illuminated by and recombining said scattered light and said circularly polarized reference beam, a polarization axis of said polarizing beamsplitter being oriented at approximately 45° with respect to a polarization axis of said scattered light,
a first polarizer illuminated by a first light exiting a first face of said polarizing beamsplitter;
a second polarizer illuminated by a second light exiting a second face of said polarizing beamsplitter;
a polarization axis of said first polarizer being oriented at approximately 45° with respect to a polarization axis of a scattered light component of said first light, a polarization axis of said second polarizer being oriented at approximately 45° with respect to a polarization axis of a scattered light component of said second light, polarization axes of said first polarizer and said second polarizer being separated by approximately 90°, a light exiting said first polarizer being a first light intensity beat signal, a light exiting said second polarizer being a second light intensity beat signal, said first and second light intensity beat signals being optical signals in quadrature that comprise beat frequency variations in light intensity;
a first photodetector illuminated by said first light intensity beat signal, the first photodetector producing an electrical in phase signal; and
a second photodetector illuminated by said second light intensity beat signal, the second photodetector producing an electrical quadrature phase signal;

whereby the quadrature signal comprises the electrical in phase signal and the electrical quadrature phase signal.

10. A method for measuring speeds and directions of particles undergoing electrophoresis in an electrophoresis sample chamber, comprising:
providing an optical quadrature interferometer having a sample holder loadable with the electrophoresis sample chamber, the sample holder positioning the electrophoresis sample chamber and the particles in a path of a main beam to produce a scattered light, the optical quadrature interferometer being configured to perform optical velocimetry on the particles by using the scattered light to generate a quadrature signal comprising characteristics related to the speeds and directions of the particles;
loading the electrophoresis sample chamber into the sample holder; and
performing optical velocimetry on the particles by using the optical quadrature interferometer to generate a quadrature signal, acquiring a data record of the quadrature signal, the data record having a length corresponding to a duration of the acquiring, and determining a frequency spectrum of the data record;

whereby a frequency resolution of the frequency spectrum is dependent upon the duration of the acquiring, and the frequency spectrum is used to determine the speeds and directions of the particles undergoing electrophoresis.

11. The method of claim 10, wherein the optical quadrature interferometer comprises a quadrature Mach Zehnder interferometer.

12. A method for measuring speeds and directions of particles undergoing electrophoresis in an electrophoresis sample chamber, comprising:
providing coherent polarized light;
splitting and modifying said coherent polarized light to generate a main beam and a reference beam;
illuminating said electrophoresis sample chamber and said particles with said main beam, thereby producing a scattered light;
recombining said scattered light with said reference beam, thereby producing a recombined light;
using at least one polarized optical component to select from said recombined light at least a first light intensity beat signal and a second light intensity beat signal, said first and second light intensity beat signals being optical signals in quadrature that comprise beat frequency variations in light intensity;
illuminating a first photodetector with said first light intensity beat signal;
illuminating a second photodetector with said second light intensity beat signal;
acquiring a data record of respective outputs of said first and second photodetectors, said data record having a length corresponding to a duration of said acquiring; and
determining a frequency spectrum of said data record;

whereby respective outputs of said first and second photodetectors comprise electrical signals in quadrature, a frequency resolution of said frequency spectrum is dependent upon said duration of said acquiring, and said frequency spectrum is used to determine the speeds and directions of the particles undergoing electrophoresis.

13. The method of claim 12, wherein said main beam is substantially linearly polarized and said reference beam is substantially circularly polarized, or said main beam is substantially circularly polarized and said reference beam is substantially linearly polarized.

* * * * *